(12) United States Patent
Manukonda et al.

(10) Patent No.: US 11,550,760 B1
(45) Date of Patent: Jan. 10, 2023

(54) TIME-BASED PARTITIONING TO AVOID IN-PLACE UPDATES FOR DATA SET COPIES

(71) Applicant: Amazon Technologies, Inc., Seattle, WA (US)

(72) Inventors: Manoj Chakravarthi Manukonda, Bellevue, WA (US); Vijay Paul Rapaka, Bellevue, WA (US); Ashish Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 401 days.

(21) Appl. No.: 16/584,871

(22) Filed: Sep. 26, 2019

(51) Int. Cl.
*G06F 16/00* (2019.01)
*G06F 16/185* (2019.01)
*G06F 16/25* (2019.01)
*G06F 16/17* (2019.01)
*G06F 16/13* (2019.01)

(52) U.S. Cl.
CPC .......... *G06F 16/185* (2019.01); *G06F 16/137* (2019.01); *G06F 16/1734* (2019.01); *G06F 16/254* (2019.01)

(58) Field of Classification Search
CPC .. G06F 16/185; G06F 16/137; G06F 16/1734; G06F 16/254
See application file for complete search history.

(56) References Cited

U.S. PATENT DOCUMENTS

| | | | |
|---|---|---|---|
| 6,745,344 B1 | 6/2004 | Joshi et al. | |
| 8,756,123 B2 | 6/2014 | Trapp et al. | |
| 2012/0209817 A1* | 8/2012 | Golab | G06F 16/254 707/688 |
| 2013/0117232 A1 | 5/2013 | Lee et al. | |
| 2014/0074770 A1* | 3/2014 | Morsi | G06F 16/9024 707/600 |
| 2015/0199413 A1* | 7/2015 | Brown | G06F 16/24554 707/602 |
| 2017/0075968 A1* | 3/2017 | Brown | G06F 16/254 |

* cited by examiner

*Primary Examiner* — Tyler J Torgrimson
(74) *Attorney, Agent, or Firm* — S. Scott Foster; Kowert, Hood, Munyon, Rankin & Goetzel, P.C.

(57) ABSTRACT

Time-based partitioning of a data set is applied to capture updates to the data set in a copy of the data set. Items that have been updated in a data set with in a time period are identified. Partitions of the data set that include the updated items are created according to a partitioning scheme. The created partitions are grouped in a storage location for the time period in a file structure that stores a copy of the database. A latest version of the copy of the data set may be accessed according to latest partitions of the data set stored in the different locations of the file structure.

18 Claims, 11 Drawing Sheets

TIME-BASED PARTITIONING TO AVOID IN-PLACE UPDATES FOR DATA SET COPIES

BACKGROUND

As the technological capacity for organizations to create, track, and retain information continues to grow, a variety of different technologies for managing and storing the rising tide of information have been developed. Such advances in storage capabilities, both in terms of storage capacity and processing capacity, are not without cost. For instance, the increasing amount of data that organizations want to store in highly performant analytical systems may result in scenarios where some copies of data sets are separately stored in archives, or other types of storage systems, separate from the source data set. In this way, the separately stored copies may reduce the burden of maintaining more data in costly analytical systems, as less costly storage technologies can be used for maintaining copies which may only be occasionally accessed. However, in such scenarios changes made to the source data for these copies may still need to be replicated to the separately stored copies in order to maintain a useful, accurate, or consistent copy. Therefore, techniques that can efficiently replicate changes from source data to copies are highly desirable.

Figure 1:
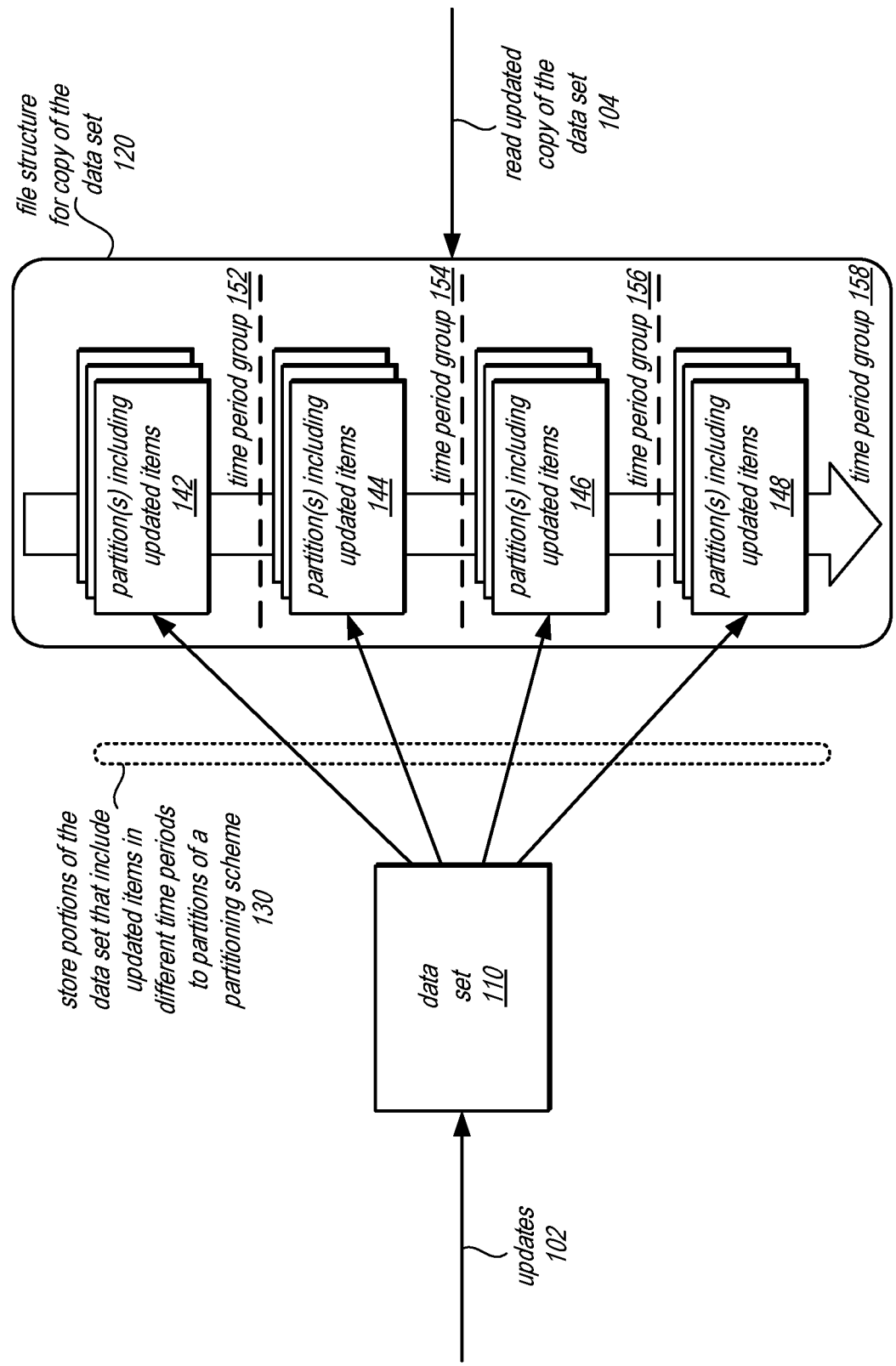
FIG. 1 illustrates a logical block diagram of time-based partitioning to avoid in-place updates for data set copies, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for time-based partitioning to avoid in-place updates for data set copies are described herein. Data sets recording various kinds of information for different kinds of systems may be copied to separate storage systems (from the source storage system that stores the data set) in order to provide additional storage, archive storage, historical storage, or other alternative storage formats, capabilities, and/or capacities. In this way, storage space, processing, capacity, or other performance benefits for the source storage system can be achieved.

In some scenarios, a separately stored copy of a data set may be updated to replicate updates made at the source data set. For example, in data lake or data archive storage systems, new updates, whether very few (and possibly infrequent) or very many (and possibly frequent), may still need to be included or otherwise replicated to a separately stored copy in order to increase the durability of the data set or make the data set available for other types of analysis or other processing, among other reasons. Instead of techniques that rely upon costly source data scan operations to locate updates and then further operations to insert or find the portions of the separately stored data sets to apply the updates in-place (e.g., in the same file, table entry, or other replicated storage location), time-based partitioning may be implemented without applying updates in-place, in various embodiments.

For example, in some embodiments, time-based partition techniques may implement a delta processing approach to generate different sets of data set partitions corresponding to different time periods. When accessing the file structure to read or otherwise access the copy of the data set, the replicated updates may be included by determining the latest version of the copy of the data set according to the respective locations of the data set partitions in the file structure. As one skilled in the art will appreciate in light of this disclosure, the examples described above, as well as various other embodiments, may be capable of achieving certain advantages, including some or all of the following: (i) avoiding scan operations to search for and apply updates to generate updated data set copies which may reduce utilization of various computational resources, such as processor, I/O, network, and memory resources, at both source and copy data storage systems; (ii) providing access to a latest or other specified version of a data set copy by updating a manifest or other data set copy metadata that points to the files or other data objects that store partitions that make up the latest or other specified version; and (iii) implementing background purge or other delete operations to remove obsolete/unwanted files or data objects that are not used to provide the latest version of the data set copy (which may allow for purge or other delete operations to be performed during periods of lighter workloads to reduce the impact of client applications accessing the copy of the data set).

FIG. 1 illustrates a logical block diagram of time-based partitioning to avoid in-place updates for data set copies, according to some embodiments. Data set 110 may be one or more collections of data items, such as various types of databases or database table(s), including data warehouses, relational databases, non-relational databases, document databases, graph databases, or other types of data item collections, including groups, buckets, or folders containing files or other data objects that store items. A copy of data set 110 may be maintained for various purposes, such as an archived copy of the data set. As illustrated in FIG. 1, a file structure, such as file structure for the data set copy 120, may be implemented to provide access to the copy. In at least some embodiments, file structure 120 may be a file system or other that describes the location of and/or provides access to different data objects (e.g., files) that together may provide a copy 120 of the latest version of data set 110.

Updates 102 may be received for data set 110, in some embodiments. For instance, client applications of a database may add new records into one or more tables to describe new events, transactions, or other information recorded as part of executing the client application. Such updates 110 may be performed as one or more requests (e.g., via Application Programming Interface (API) or protocol (e.g., internal small computer systems interface (iSCSI)) which may in turn need to be replicated to the copy of data set 110.

In some embodiments, a partitioning scheme may be implemented for storing a copy of the data set. For example, a partitioning scheme may utilize one or more values of items in the data set, such as time and/or data value (e.g., an "order date" as discussed below with regard to FIGS. 5 and 6), or value(s) derived from a value of the data set (e.g., a hash value determined from a serial number of other item identifier value), to sort, distribute, or otherwise determine an individual partition within which to place an item from data set.

Time-based partitioning utilizing the partitioning scheme may be implemented in various embodiments to capture the update 102 made to data set 110 with different time periods, as discussed below with regard to FIGS. 3, and 5-8. For instance, for a first time period items within data set 110 that were updated may be identified (e.g., utilizing a transaction log that describes updates or other metadata, or using a column field in an item that indicates date and/or time of last update for the item). If an item is identified as updated, then the updated item as well as any other items that would be included in a partition of that item according to the partition scheme may be copied from data set 110 and stored 130 in a respective partition in file structure 120 associated with that time period group. For example, an update identified for an item within a time period associated with time period group 152 would be stored as a partition 142 in time period group 152 (along with other items that would be part of the partition even if not updated). This technique would be repeated for other items identified as updated within the same time period, such that other partitions including both the updated items and non-updated within the same time period would be stored as respective partitions 142 in time period group 152.

In various embodiments, this technique may be applied for each subsequent time period. Thus, partition(s) 144, 146, and 148 may be partitions including updated items (and any non-updated items that are also included in the partition of data set 110) in respective time period groups 154, 156, and 158. If no item for a partition in a time period is updated, then in some embodiments, that partition may not be created and stored in the respective time period group of file structure 120. For example, if an item in partition A is updated in the time period for time period group 152 then partition A may be created as a partition 142 in time period group 152. If no item in partition A is updated in the time period for time period group 154, then no partition A may be stored in time period group 154. Thus, in at least some embodiments, only those partitions with at least one updated item may be stored in a time period group, and partitions with no updated items may not be created for that time period group.

As indicated by the downward arrow, each time period group may, in some embodiments, be associated with different respective time intervals (e.g., a "run date" for performing the update item search and partition creation). In some embodiments, these time period groups may be the same (e.g., every 24 hours) or of varying lengths (e.g., a time period group may be identified by triggering the partition scheme after a minimum number of updates or amount of change from updates to data set 110 is performed) since a prior iteration of creating partitions.

File structure 120 may implement different storage locations for partitions associated with different time period groups, such as time period groups 152, 154, 156, and 158. These storage locations may be implemented as different first level folders or directories which contain as second level folders, directories, or data objects the respective partitions for a time period group. However, in other embodiments, other multi-level file structures or arrangements (e.g., including 3 or more levels) may be utilized, and thus the previous examples are not intended to be limiting. For example, a level lower than a partition level could be implemented to store subsets of the partition (e.g., a particular user's data, a particular item's data, a particular location's data, etc.).

As discussed below with regard to FIG. 9, reads 104 or other use of the copy of the data set may be made by accessing the file structure 120. The file structure may be searched when a read is performed, or a manifest may be utilized that already indicates which partitions constitute or together combine to store the latest version of the copy of data set 110. For instance, a different data processing system, such as a different database or analytics system may mount, attach, or read from the partitions identified for the latest version of the data set 110 from the respective partitions. For example, the latest in time, time period group 158 may be first evaluated to see if all needed partitions are present. If not, then the missing partitions may be searched for in reverse time order (e.g., time period group 156, then 154, then 152) until found. If multiple versions of the same partition exist in different time period groups, the version in the later time period group is considered to be included in the latest version of the data set.

Over time, some partitions may become obsolete, as a later version of the partition may replace the older version, which may no longer be used to make up the latest version of the data set. As discussed below with regard to FIGS. 4, 6, and 8, techniques to purge or delete some partitions may be performed to prevent storage waste (or wasted computational time/resources to identify which of multiple versions of a partition is the latest).

Please note that the previous description of time-based partitioning to avoid in-place updates for data set copies a logical illustration and thus is not to be construed as limiting as to the partitioning scheme, data set, number of partitions or file structure. Various types of systems, as noted below, may implement these techniques utilizing different file structures that can maintain or store created partitions associated with different time period groups in different locations.

This specification begins with a general description of a provider network that implements an extract, transform, load (ETL) service that identifies, transforms, and moves data stored in the provider network or external data stores to other data stores (e.g., within provider network or external to the provider network). Then various examples of the ETL service including different components/modules, or arrangements of components/module that may be employed as part of implementing the ETL service are discussed. A number of different methods and techniques to implement time-based partitioning to avoid in-place updates for data set copies are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
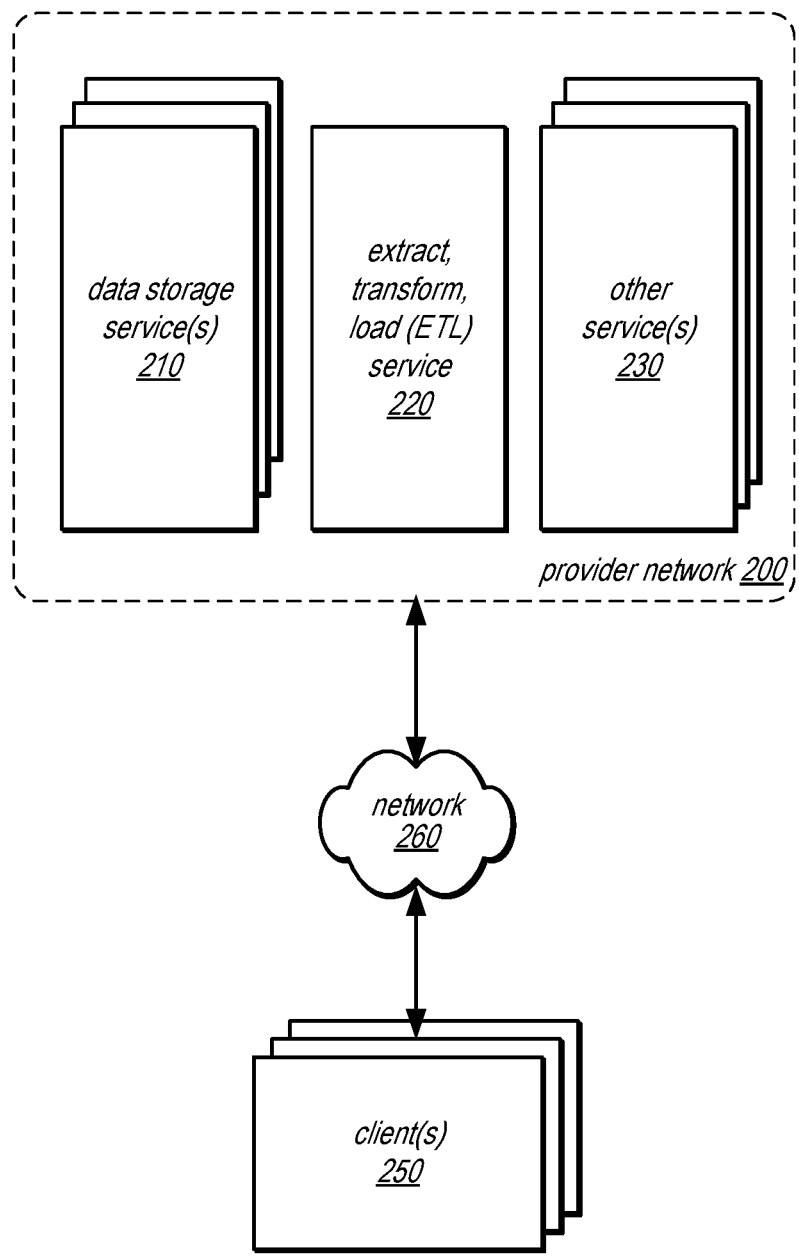
FIG. 2 is a logical block diagram illustrating a provider network offering different services including an extract, transform, load (ETL) service that can perform time-based partitioning to avoid in-place updates for data set copies, according to some embodiments.

FIG. 2 is a logical block diagram illustrating a provider network offering different services including an extract, transform, load (ETL) service that can perform time-based partitioning to avoid in-place updates for data set copies, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as a data storage service(s) 210 (e.g., object storage services, block-based storage services, or data warehouse storage services), ETL service 220, as well as other service(s) 230, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data storage service 210 or ETL service 220) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses for storing, querying, and updating data, and as such may be the storage systems for source data sets or copies of data sets. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs) or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, ETL service 220 may create and dynamically update a catalog of data stored on behalf of clients in provider network 200 across the various data storage services 210. For example, a database stored in a non-relational database format may be identified along with container storing objects in an object-based data store as both being stored on behalf of a same customer of provider network 200. ETL service 220 may also perform ETL jobs that extract, transform, and load from one or more of the various data storage service(s) 210 (or an external data store not illustrated) to another location. For example, ETL service 220 may provide clients with the resources to create, maintain, and orchestrate data loading jobs that take one or more data sets, perform various transformation operations, and store the transformed data for further processing (e.g., by one or more of data processing service(s)). For instance, techniques for implementing time-based partitioning to avoid in-place updates for data set copies may be submitted as ETL jobs that are executed periodically or a periodically for respective time periods. In some embodiments, ETL service 220 may access a data catalog generated by ETL service 220 in order to perform an ETL operation (e.g., a job to convert a data object from one file type into one or more other data objects of a different file type).

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of ETL service 220 in order to invoke the execution of an ETL job to make data available for processing in a different location or data format for performing various processing operations with respect to data sets stored in data storage service(s) 210.

Generally speaking, clients 250 may encompass any type of client configurable to submit network-based requests to provider network 200 via network 260, including requests for storage services (e.g., a request to create, read, write, obtain, or modify data in data storage service(s) 210, a request to generate an ETL job at ETL service 220, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture. Although clients 250 are illustrated as external to provider network 200, in some embodiments clients of different services, like ETL service 220, can be implemented within provider network 200 (e.g., implemented on a resource of other service(s) 230, such as virtual compute instance).

In some embodiments, a client 250 may be configured to provide access to provider network 200 to other applications in a manner that is transparent to those applications. For example, client 250 may be configured to integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s) 210, operations, tasks, or jobs, being performed as part of other service(s) 230, or to interact with ETL service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

As noted above, ETL service 220 may implement time-based partitioning to avoid in-place updates for data set copies by executing the time-based partitioning as an ETL job. Also note that other types of systems or applications may implement similar techniques. For example, a data storage service 210, such as a data warehouse service, may implement time-based partitioning to avoid in-place updates for data set copies as part of an archive operation that is performed for a data warehouse stored in the service. Therefore, ETL service 220 is one example of an application that implements the described techniques.

ETL service 220 may provide access to data catalogs (of different databases or other data sets stored within provider network 200 or in external data storage systems) and ETL jobs (for creation, management, and execution) via an interface, which may be a programmatic interface (e.g., Application Programming Interface (API)), command line interface, and/or graphical user interface, in various embodiments.

ETL service 220 may handle the creation of ETL jobs through manual job creation (e.g., creating, edit, or uploading ETL code or creating or editing graphs of ETL jobs) or through automated job creation. ETL service 220 may handle requests for automated ETL job creation and manual ETL job creation. For example, ETL service 220 may receive a job generation request which may a data set for time-based partitioning and a destination data store for the file structure that will store the different time group periods of partitions in different storage locations. Other job information, such as access credentials, triggering events (e.g., which may specify a time period for generating partitions in a time period group), or any other information to execute the ETL job may be included as part of the creation request or as part of a trigger event registration request. ETL service 220 may automatically generate ETL code to perform an ETL job by determining the source data format of the data object and the target data format of the data object. For example, in one embodiment, the source and target data formats may be determined from a data catalog, and may be used to generate the ETL code to automatically store partitions as well as the file structure for storing the time period groups of different partitions. ETL service 220 may also implement manual creation of ETL jobs. For example, transformation operations, including the partitioning scheme for time-based partitioning, may be manually selected, combined, or assembled via graphical user interface to define a workflow of transformations to apply. Code corresponding to the workflow may be generated (or supplied by a user), edited, and stored for subsequent execution as part of ETL service 220.

ETL service 220 may allow clients to manage, edit, delete, or otherwise change ETL jobs. Trigger events, may also be defined for ETL jobs, which can be modified (e.g., the time period group thresholds may be changed from a time-based trigger to an update amount based trigger). ETL service 220 may monitor for trigger events and initiate execution of ETL jobs.

ETL service 220 may implement an execution system for ETL jobs. In some embodiments, such as ETL job execution coordinator 310 and ETL job execution workers 320). In some embodiments, ETL service 220 may provide a serverless architecture (from the perspective of clients) so that the appropriate number of resources are provisioned (e.g., virtual compute instances from a virtual compute service executing the ETL job code) in order to satisfy performance requirements, objectives, or goals provided by a client or by ETL service 220. ETL service 220 may execute jobs, in some embodiments, automatically without any user editing changes to the automatically generated ETL code. In some embodiments, ETL service 220 may execute automatically generated ETL jobs that were modified. ETL job execution 340 may execute jobs in response to detected triggering events for ETL jobs (which may be detected by ETL job management or another system or service monitoring for triggering event conditions).

As noted above, ETL service 220 may maintain data catalogs that describe data sets (stored in provider network 200 or in external storage locations). ETL service 220 may identify unknown data objects, identify a data format for the unknown data objects and store the data format in a data catalog for the unknown data objects. ETL service 220 allow for catalog users, owners, or other stakeholders, to modify or otherwise manage data catalogs. For instance, ETL service 220 may process and execute access requests directed to data catalog(s) (e.g., requests to combine, delete, or split tables of metadata in the catalog or edit the metadata determined for a data catalog). ETL service 220 may implement access or control policies for data catalogs (e.g., to limit access to a data catalog to authorized users). ETL service 220 may implement data retention or life cycle policies to determine how long data catalogs (or older versions of data catalogs) are maintained. ETL service 220 may handle the provisioning of storage resources in data for creating new data catalogs. ETL service 220 may also perform load balancing, heat management, failure recovery, and other resource management techniques (e.g., implement durability requirements) to ensure the availability of data catalogs for clients.

Storage for data catalog(s) may be implemented by one or more storage nodes, services, or computing devices (e.g., system 1000 discussed below with regard to FIG. 10) to provide persistent storage for data catalogs generated by data catalog service 200. Such storage nodes (or other storage components of storage for data catalog(s)) may implement various query processing engines or other request handling components to provide access to data catalogs according to requests received via an interface (not illustrated). For example, data catalog storage may be implemented as a non-relational database, in one embodiment, that stores file types and other metadata for data objects in table. In some embodiments, collections of metadata for various data objects stored across different storage service(s) 210 on behalf a single user account may be stored together in a single catalog of metadata that may be made accessible to clients.

Figure 3:
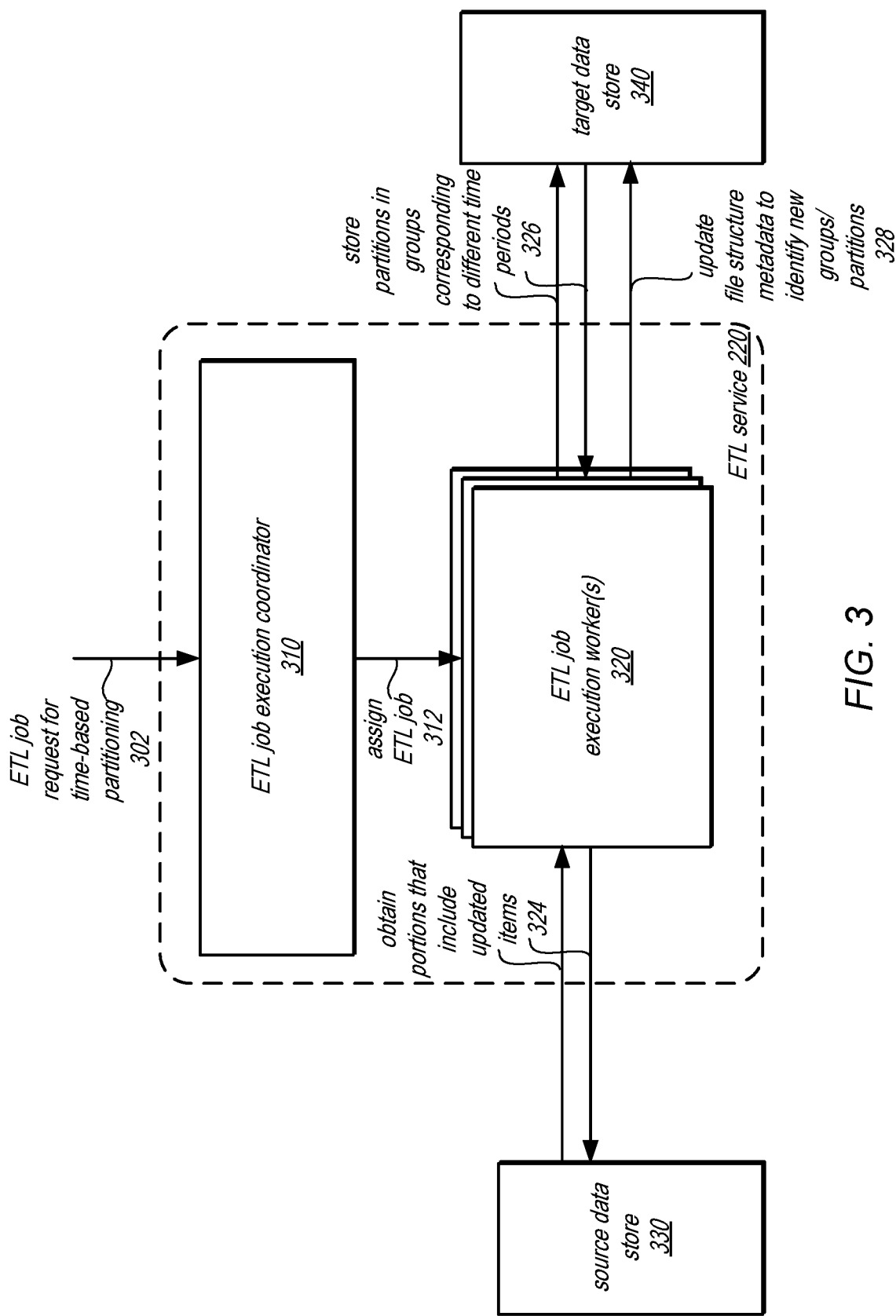
FIG. 3 is a logical block diagram illustrating an ETL job executed by an ETL service that performs time-based partitioning for a data set to create a data set copy, according to some embodiments.

FIG. 3 is a logical block diagram illustrating an ETL job executed by an ETL service that performs time-based partitioning for a data set to create a data set copy, according to some embodiments. ETL service 220 may implement an ETL job execution coordinator 310 that assigns ETL jobs 312 to one or more ETL job execution workers(s) 320 which may access source data store 330 and target data store 340 to obtain data, apply transformations, such as time-based partitioning and store transformed data, such as partitions in time groups. ETL job time-based partitioning request 302 may be a request submitted via an interface ETL job service 220, discussed above, which may specify how to execute time-based partitioning, including the partitioning scheme, time period groupings, source and target data formats, and other technique features. For example, the various example scripts discussed below with regard to FIGS. 6A-6B may be specified, referenced, or invoked by ETL job request for time-based partitioning 302. ETL job execution coordinator 310 may determine the resources needed to execute the ETL job and assign the ETL job to one or more ETL job execution worker(s) 320.

ETL Job execution worker(s) 320 may get information (including executable code, invoked operations or transformations, and other information (e.g., access credentials or other job configuration parameters) to execute the identified ETL job from the request 302, assignment 312, or from an ETL job store that stores ETL jobs, including execution code and/or other information (not illustrated). ETL job execution worker(s) 320 may then perform the ETL job in parallel or serialized fashion. For example, ETL job workers may begin at a next time period for the ETL job (as may be specified by a trigger event, such as time period, or determined from an amount of updates made to the source data set) and obtain 324 portions of the data set that include updated items. For example, ETL job workers may issue queries, scans, or other searches for updated items and from the updated items obtain the portion of data corresponding to a partition of a partitioning scheme that includes an updated item from the source data store 330 (which may be a data storage service 210 of provider network 200 or an external data store). In some embodiments, ETL job execution worker(s) 320 may establish a connection to transfer data from source data store 330 and send one or more requests to obtain some or all of a source data object (e.g., via API requests for the source data store or via storage or transfer protocol, like secure file transfer protocol (SFTP) or an internet Small Computer Systems Interface (iSCSI)).

ETL job execution worker(s) 320 may perform one or multiple operations to transform the obtained portions into respective partitions according to a partitioning scheme and format the partitions according to a format for storage in target data store 340. For example, if the data is obtained in file format A but is stored in file format B, ETL job execution workers may obtain each item that belongs in a partition to be created (including the at least one updated item) and apply one or more encoding, decoding, or other reformatting techniques to modify the items into format B.

ETL job execution workers(s) 320 may then store 326 the generated partitions in the locations for a time period group associated with the partition in target data store 340. For example, ETL job execution worker(s) 320 may put partition data objects or files in a folder, directory, bucket, or other collection that corresponds to the time period group. This time period group may be first created by ETL job execution worker(s) 320 (e.g., by submitting an API or other request to create the storage location in a file structure maintained in target data store 340 for the copy of the data set) if the storage location does not already exist, in some embodiments. ETL job execution worker(s) 320 may establish a connection to store 326 the partitions into target data store 340 (which may be the same or different as source data store 330) via API requests for target data store 340 or via storage or a transfer protocol, like SFTP or iSCSI. ETL job execution worker(s) 320 may also access and update an ETL job execution log (not illustrated) with job execution status in the event of a failure of one or more ETL job execution workers so that the ETL job can be continued. For example, ETL job execution workers may identify the progress of the ETL job (e.g., X partitions out of Y total partitions in a time period group generated and stored). In this way, failures of ETL job execution worker(s) 320 may be recovered from by access ETL job execution log to determine the last processed partition of a source data set. Errors and other events may be recorded for the ETL job in the ETL job execution log, in some embodiments. ETL job execution worker(s) 320 may send indications of completion of the ETL job to ETL job execution coordinator 310, in some embodiments, which may be a trigger event or execution criteria for other ETL jobs. ETL job workers 320 may, in some embodiments, update 328 a manifest, or other metadata for a file structure that stores the copy of the data set to identify the new partition and time period group.

Figure 4:
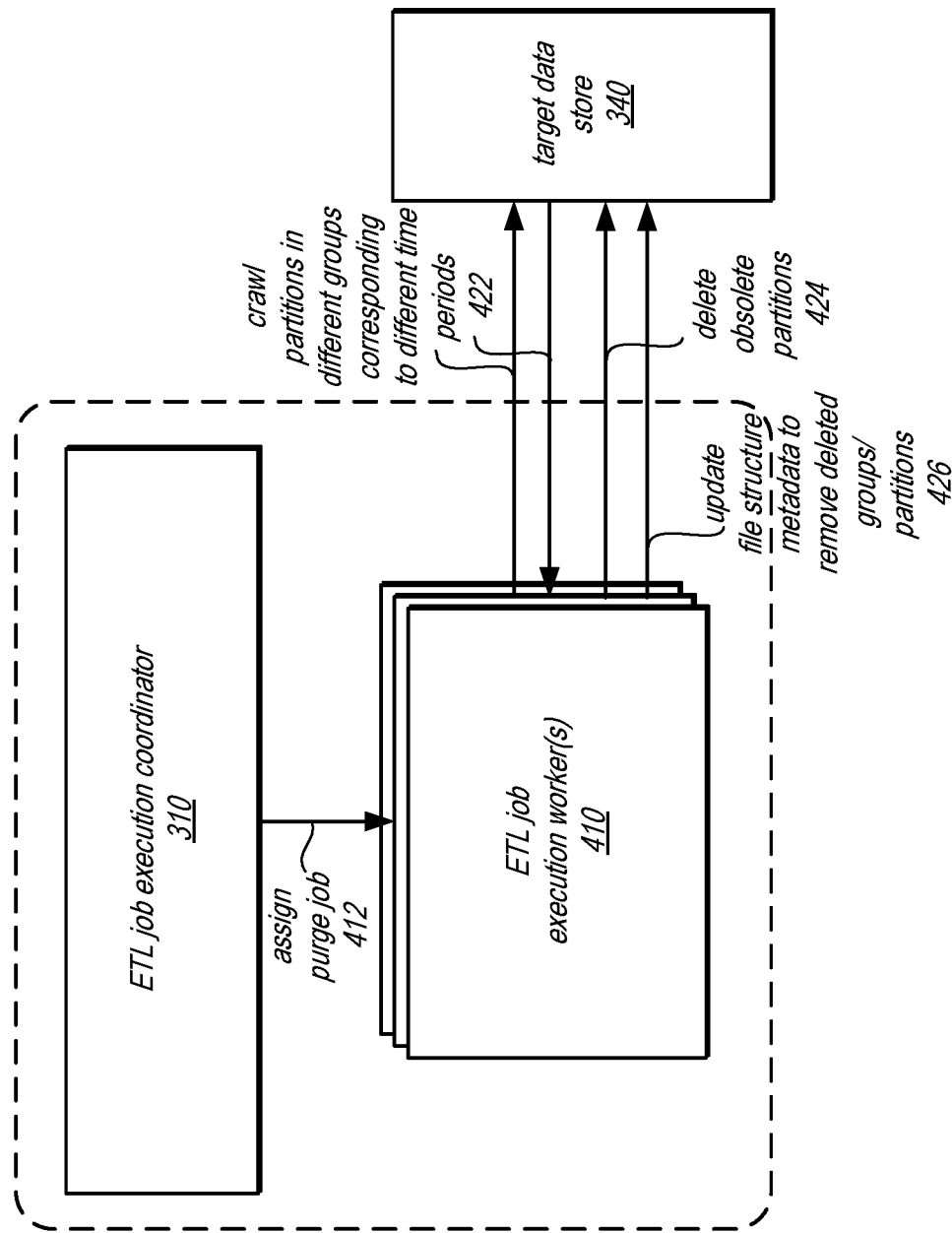
FIG. 4 is a logical block diagram illustrating ETL execution to purge obsolete partitions from a file structure for a copy of a data set, according to some embodiments.

The number of partitions generated may grow over time. In some embodiments, the partitions may be retained in order to provide a history of changes made to a data set (e.g., within a retention threshold, such as 1 year, 6 months, etc.). In other embodiments, only the latest version may be desirable to maintain, and thus techniques to remove stale, unneeded, or otherwise obsolete partitions may be performed. In some embodiments, a size threshold for the file structure may be enforced so that a purge technique may be implemented in response to the size of a file structure exceeding the threshold size. In at least some embodiments, an ETL system like ETL service 220 may perform the purge technique, though other systems may perform the technique instead. FIG. 4 is a logical block diagram illustrating ETL execution to purge obsolete partitions from a file structure for a copy of a data set, according to some embodiments.

Like in FIG. 3, ETL job execution coordinator 310 may assign a purge job 412 for the file structure in target data store 340 to one or more ETL job execution worker(s) 410. ETL job execution worker(s) 410 may be the same workers 310 in FIG. 3, or in some embodiments, may be different job execution workers. The purge job may identify the file structure, provide any access credentials, configuration parameters, or any other information for accessing and modifying the file structure in target data store 340.

In some embodiments, ETL job execution worker(s) 410 may crawl 422 the partitions in the different groups corresponding to different time periods to identify the existence of multiple versions of the same partition in different time period groups. For example, each partition name may be scanned and added to a list, so that if a partition name for another time group is added that conflicts with an existing list the partition that is later in time may be retained and the earlier partition deleted. ETL job execution worker(s) 410 may send requests to delete obsolete partitions 424 as a result of crawling the partitions to target data store (e.g., requests to delete the file objects that store a partition). ETL job execution worker(s) 410 may, in some embodiments, update 426 the file structure metadata to remove deleted groups/partitions. For instance, if all partitions from a group are deleted, then the storage location for the time period group may be removed from a manifest.

Figure 5:
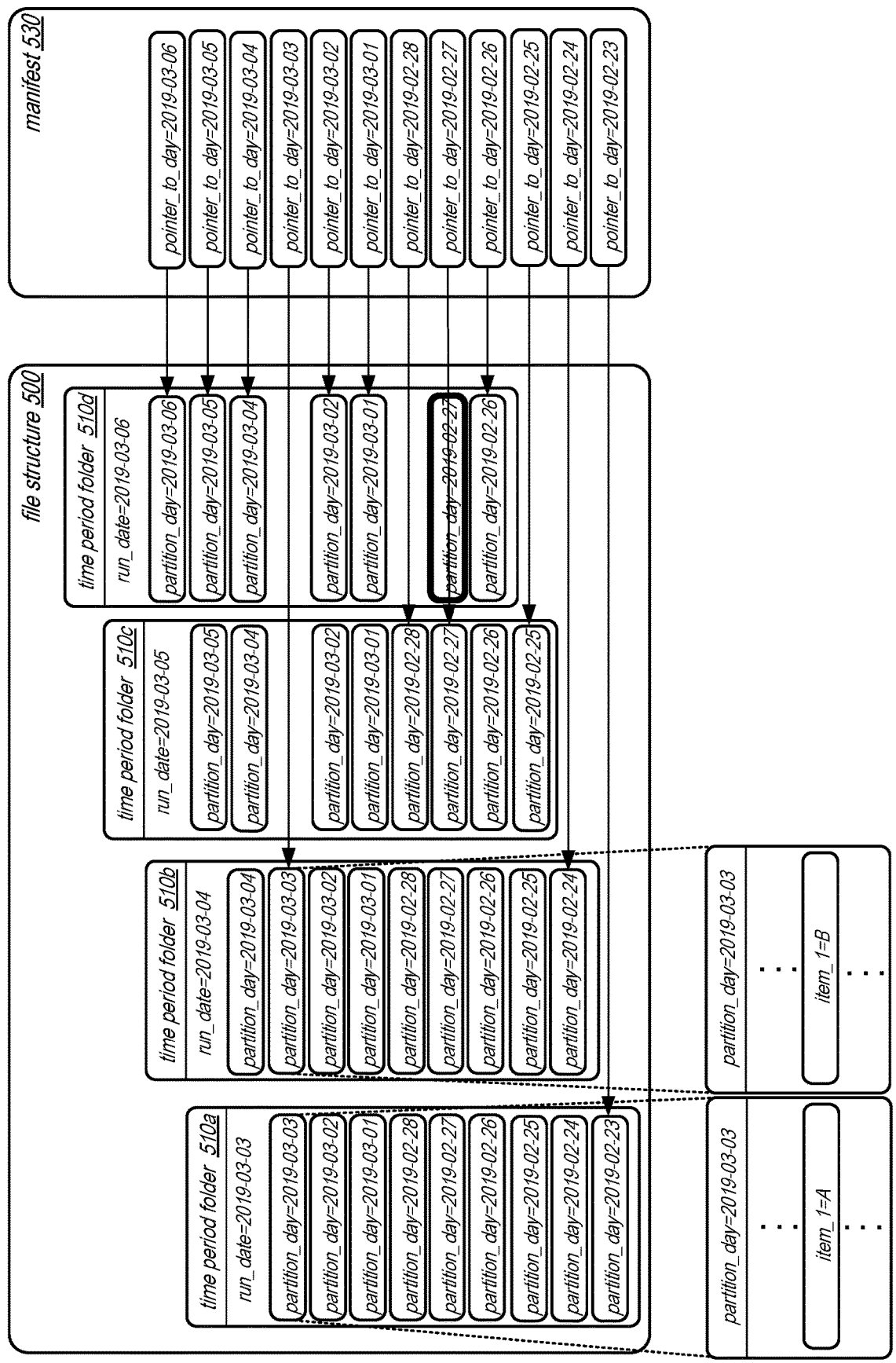
FIG. 5 is a logical block diagram illustrating an example file structure for time-based partitions stored in different time period groups, according to some embodiments.

Different file structures may be implemented to store time period groups in different storage locations. In some embodiments, a multi-level file hierarchy or file system may be implemented. FIG. 5 is a logical block diagram illustrating an example file structure for time-based partitions stored in different time period groups, according to some embodiments. File structure 500, for instance, may utilize a first level hierarchy of different time period folders, such as time period folders 510a, 510b, 510c, and 510d. Each time period folder may correspond to a different time period in which the partitions stored within the hierarchy were generated. For example, timer period folder 510 has a run date or execution date of Mar. 3, 2019, whereas time period folder 510d may have a run date or execution date of Mar. 6, 2019.

Each partition may be stored as a separate sub-folder (or second-level folder) or file object. For instances, different partition objects for different days (e.g., where the partitioning scheme is by date) may be stored in each time period folder, where each partition day included an update to an item with that day value that was not included in a previous time period. For example, partition day Mar. 3, 2019 may have an item_1=A, whereas a different version of the same partition stored in time period folder 510b, with run date of Mar. 4, 2019, may have item_1=B. Although not illustrated in FIG. 5, further sub-sub-levels (and beyond) could be implemented provide further granularity of data. For example, within a folder for partition day Mar. 3, 2019 could be a folder for User A's data and a folder for User B's data, and a folder for User C's data, and so on. These lower level folders could be created in order to create views or projections of the larger data set.

As discussed above, a manifest or other metadata may also be maintained in order to directed client applications that access the file structure to the partitions that make up the latest version of the copy of the data set that is stored (e.g., latest as of the last time the partitioning scheme was applied, such as the latest version as of Mar. 6, 2019). Manifest 530 may include pointers to those partitions that are the latest version of that partition in each time period folder 510. For example, the latest partition for Mar. 3, 2019 may be in time period folder 510b, but the latest version of the partition for Mar. 2, 2019 may be in time period folder 510d.

In some embodiments, quality checks or controls may be enforced when generating a manifest. For example, data corruption or other qualify concern of a partition may be detected, and that partition may be excluded from the manifest. For example, in manifest 530 pointer_to_day=2019-02-27 may point to time period folder 510c instead of time period folder 510d (because of a quality check failure for the partition_day=2019-02-26 in time period folder 510d).

Figure 6A:
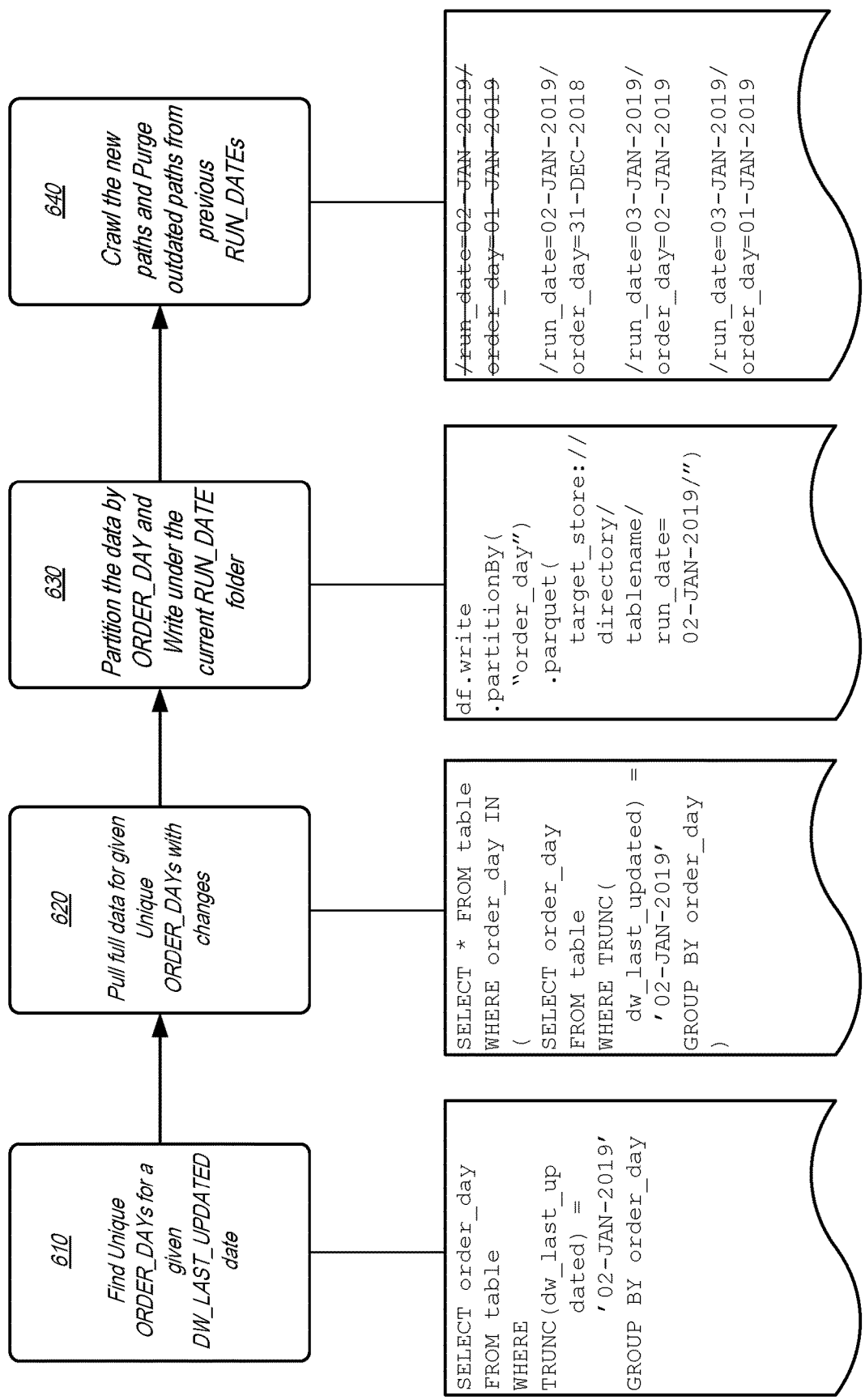
FIGS. 6A-6B illustrates example ETL jobs for time-based partitioning according to a date based partitioning, according to some embodiments.
Figure 6B:
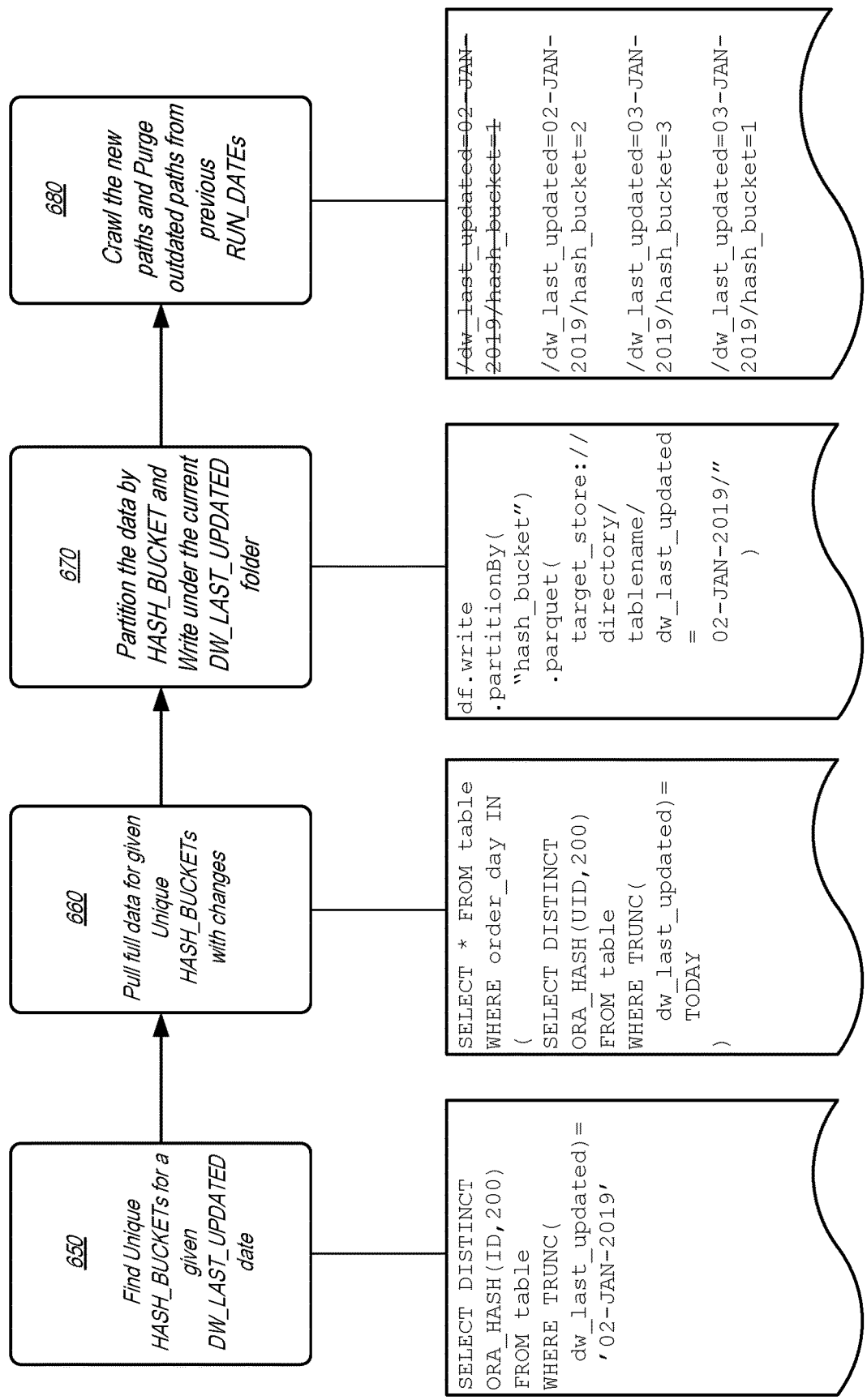

Different scripts or other techniques for identifying items, generating partitions according to a partitioning scheme, and storing partitions may be implemented. FIGS. 6A-6B illustrates example ETL jobs for time-based partitioning according to a date based partitioning, according to some embodiments. FIG. 6A illustrates an example of an ETL job that utilizes an "order day" field in a table record for partitioning. In job element 610, unique order days with a last updated value equal a specified date (e.g., today). In job element 620, the full data for the given unique order days may be pulled or otherwise copied from the source table to include the changes. As indicated at element 630, the pulled data may be partitioned by order data and written under the current run date folder. The, as indicated at element 640, the new paths in the file structure may be crawled to determine whether outdated paths for earlier versions of partitions should be purged (e.g., as exemplified by the strike through of order=01_JAN-2019).

Similar techniques may be implemented for other types of partitioning schemes, in other embodiments. For example, for dimension tables that do not utilize a date value, a hashing scheme could be implemented with respect to a value such as a UID for a table record. Consider a technique, as indicated at 650, where DW_LAST_UPDATED value is used similar to RUN_DATE in FIG. 6A, and pulling all records for the DW_CREATION_DATEs with updates. A complete list of DW_CREATION_DATE records could then be created. AA hashing scheme could be applied to a HASH_KEY which buckets multiple primary key values into a single bucket, and then identifies all HASH_KEY buckets with updates in a latest day. Then, all latest version of records for only those HASH_KEY buckets with updates for a given RUN_DATE may be pulled, as indicated at 660. The buckets can then be scanned using partition scanner to identify most recent full RUN_DATE for each bucket and written to the current DW_LAST_UPDATED folder, as indicated at 670. As indicated at 680, the new paths in the file structure may be crawled to determine whether outdated paths for earlier versions of partitions should be purged (e.g., as exemplified by the strike through of hash_bucket=1).

Although FIGS. 2-6B have been described and illustrated in the context of an ETL service, the various techniques and components illustrated and described in FIGS. 2-6A may be easily applied to other data access or management systems in different embodiments that may implement time-based partitioning to create and update a copy of a data set. Stand-alone ETL processing systems are an example of another embodiment that may be implemented in private networks or systems to perform similar techniques to those described above. As such, FIGS. 2-6A are not intended to be limiting as to other embodiments of a system that may implement time-based partitioning for.

Figure 7:
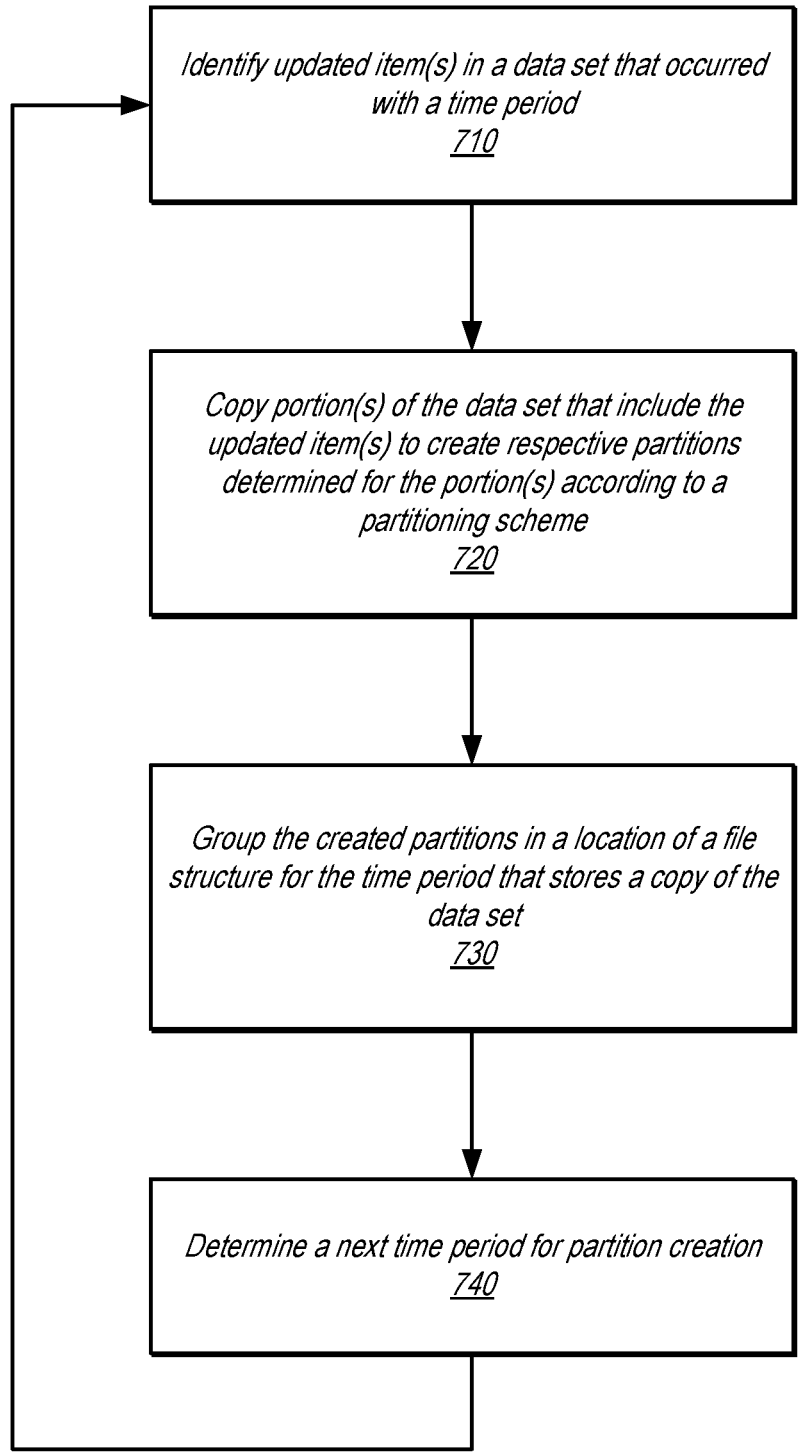
FIG. 7 is a high-level flowchart illustrating various methods and techniques to implement time-based partitioning to avoid in-place updates for data set copies, according to some embodiments.

FIG. 7 is a high-level flowchart illustrating various methods and techniques to implement time-based partitioning to avoid in-place updates for data set copies, according to some embodiments. Various different systems and devices may implement the various methods and techniques described below, either singly or working together. For example, an ETL service such as described above with regard to FIGS. 2-6B may be configured to implement the various methods. Alternatively, a combination of different systems and devices, such as a storage subsystem that manages access to data stored in directly attached storage devices may transform data using ETL processing the below techniques. Therefore, the above examples and or any other systems or devices referenced as performing the illustrated method, are not intended to be limiting as to other different components, modules, systems, or configurations of systems and devices.

The creation and update of a file structure to store a copy of a data set may be iteratively performed, in various embodiments. A first iteration may include creating a base snapshot or copy of the entire source data set, as partitions according to the same partitioning scheme discussed below. In this way, the time-based partitions of later iterations need not be created if no update is performed. As indicated at 710, update item(s) in a data set that occurred within a time period under consideration may be identified. For example, a version identifier may be maintained for each record in a table, which may be compared with a version identifier for the record in the last iteration of generating partitions for the table. If the version identifier has changed, then the record may be updated. Other techniques, such as using a update timestamp filed, may be utilized, or an update log that describes updates may be scanned to identify those updates that occurred since a last partition creation iteration (which may be marked in the log).

As indicated at 720, portion(s) of the data set that include the updated item(s) may be copied to create respective partitions determined for the portion(s) according to a partitioning scheme, in some embodiments. For example, as discussed above, with regard to FIG. 6A, a partitioning scheme may partition items by a date value for the items. Those items with the same data value may be in the same partition. A portion may the items that have the same date value copied into a partition for that data value, in such an example. Other partitioning techniques may be implemented. For instance, one or multiple level partitioning schemes including value-based partition upon a value of an item (e.g., the date value) and/or derived or assigned values for an item, such as a hash-based scheme), may be applied to determine the portions. As noted above, each created partition may include all items from the data set that belong to that partition, even if only one item in the partition is updated, in some embodiments. Partitions for which not items are identified as updated may not be created for the time period, in some embodiments.

As indicated at 730, the created partitions may be grouped together in a location of a file structure for the time period, in some embodiments. The file structure may store a copy of the data set for subsequent access, in some embodiments. A multi-level file structure may be implemented in some embodiments, so partitions associated with a same time period are stored in a same location (e.g., on a common path that excludes other partitions not associated with the time period).

A next time period for partition creation may then be determined, as indicated at 740, which may restart the partition creation technique for the next time period. In some embodiments, the next time period may be identified according to an amount of elapsed time or may be identified according to an amount of updates made to the data set. In some embodiments, the time period may be triggered by a request to update the copy (e.g., from a user via an interface or from an archive application).

Figure 8:
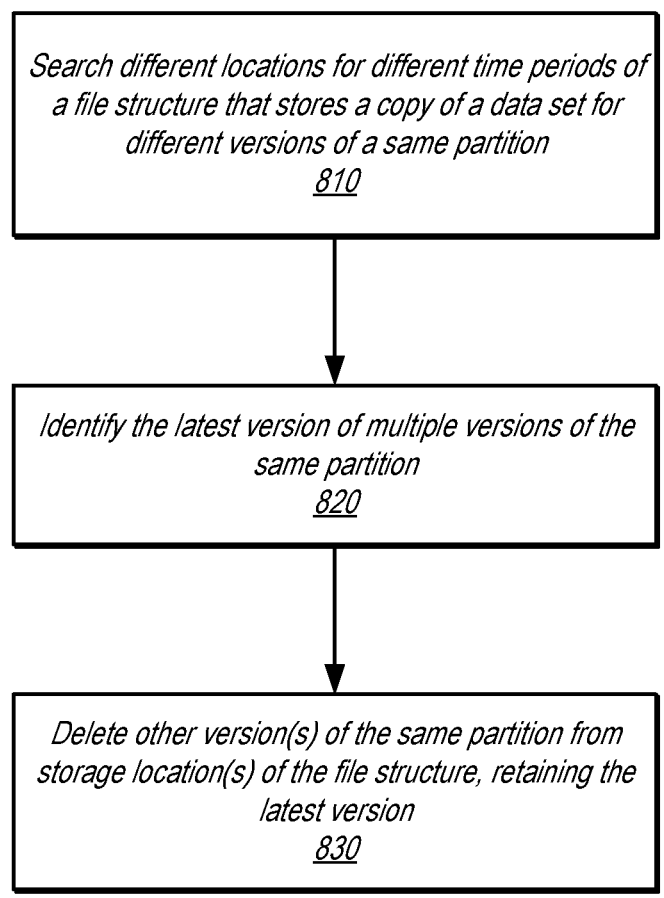
FIG. 8 is a high-level flowchart illustrating various methods and techniques to implement purging obsolete partitions of a file structure storing a copy of a data set, according to some embodiments.

FIG. 8 is a high-level flowchart illustrating various methods and techniques to implement purging obsolete partitions of a file structure storing a copy of a data set, according to some embodiments. As indicated at 810, different locations for different time periods of a file structure may be searched for different versions of a same partition, in some embodiments. For example, a list of identified partitions may be maintained and which is updated when new partitions are added for new time period groups. The list may be searched when updated or in response to a request or other event to purge obsolete partitions. In some embodiments, the only versions that can be deleted may be versions of partitions created earlier than a retention time for the data set.

As indicated at 820, multiple versions of the same partition may be discovered, in some embodiments. The latest version of the multiple versions for the same partition may be identified. For example, the storage location (e.g., directory or folder storing the partition) may indicate the time period associated with the partition and thus may be used to compare time periods for the different versions of the same partition. As indicated at 830, the other versions, earlier than the latest version of the same partition, may be deleted from their corresponding storage locations of the file structure, while retaining the latest version, in some embodiments. In some embodiments, partitions may be used to provide access to different versions of the data set (as discussed below) and thus may not be deleted. Instead, a retention threshold may be maintained so that access to older versions can be retained within the time window.

Figure 9:
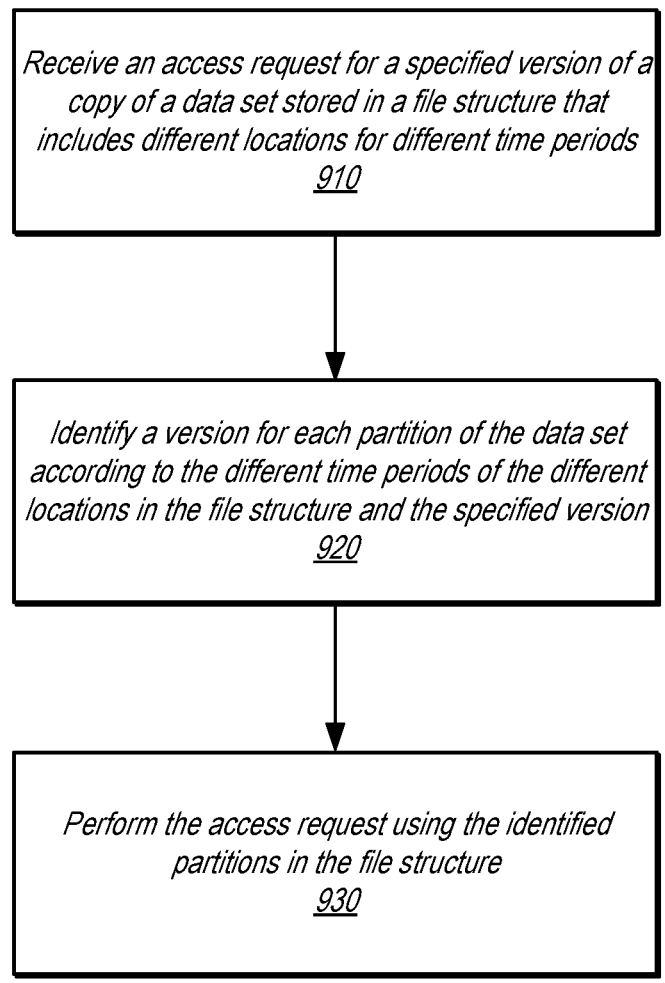
FIG. 9 is a high-level flowchart illustrating various methods and techniques to perform an access request to a copy of a data set maintained in a files structure created from time-based partitioning, according to some embodiments.

FIG. 9 is a high-level flowchart illustrating various methods and techniques to perform an access request to a copy of a data set maintained in a files structure created from time-based partitioning, according to some embodiments. As indicated at 910, an access request may be received for a specified version of a copy of a data set stored in a file structure that includes different locations for different time periods, in some embodiments. For example, the request may specify the latest version, or an older version. In some embodiments, the access request may specify the version according to a time value or version identifier value. In some embodiments, the access request may by default be directed to the latest version if no version is specified.

As indicated at 920, a version of each partition of the data set used to perform the access request may be identified according to the different time periods of the different locations in the file structure, in some embodiments. For example, a manifest or other metadata may maintain pointers or other indicators of the latest version of each partition. In other embodiments, in response to an access request the file structure may be searched (e.g., by reading titles of folders, directors, or other file structure entries) to identify the partition versions that provide the data set as of the specified version (e.g., versions that provide an "older view" of the data when an "older" version is specified). As indicated at 930, the access request may be performed using the identified partitions in the file structure, in some embodiments. For example, the partitions may be mounted, loaded, ingested, or read in order to perform the access request. In some embodiments, the partitions may be mapped to database partitions or identified as external tables to be accessed by a database system.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
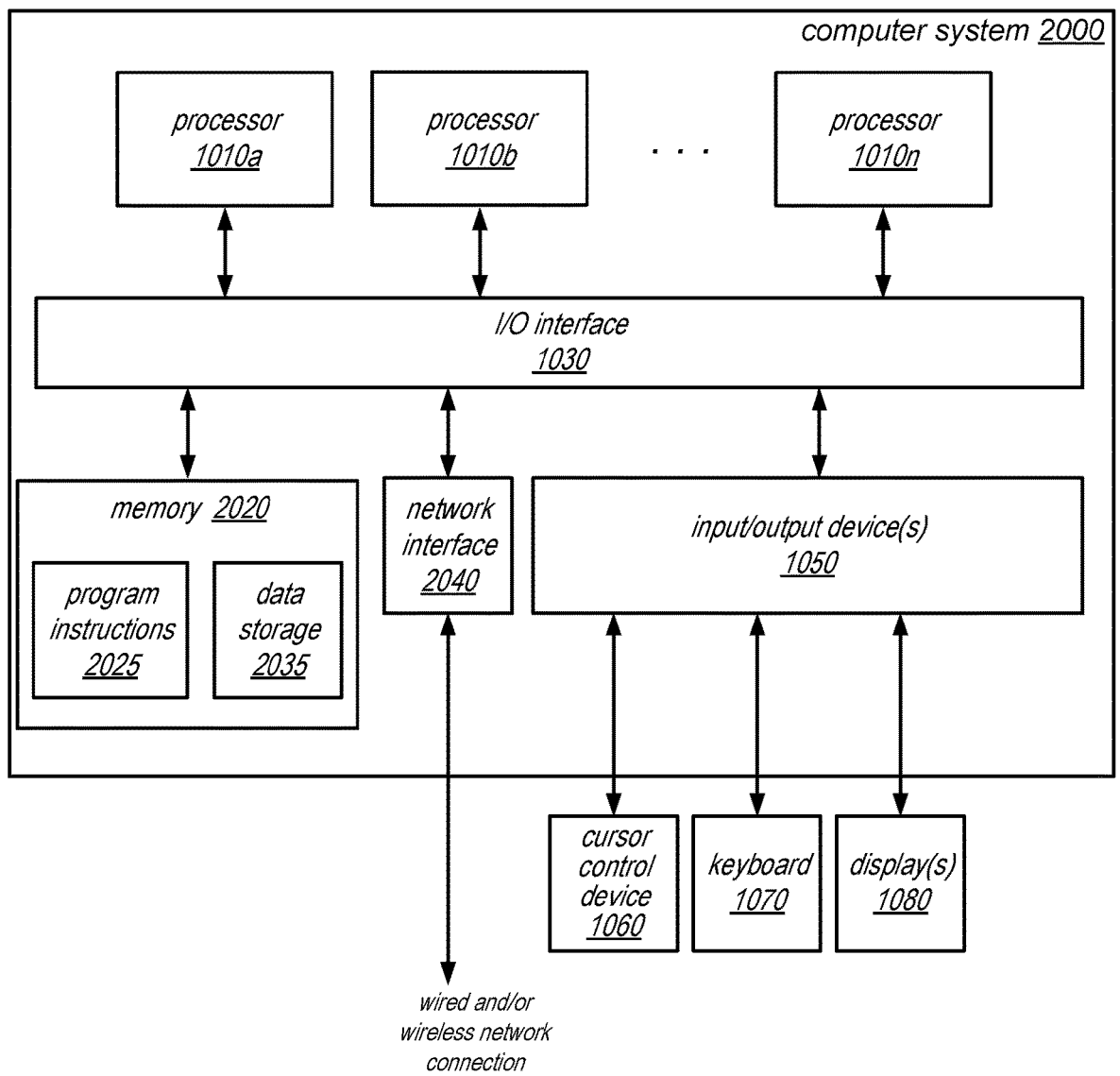
FIG. 10 illustrates an example system configured to implement the various methods, techniques, and systems described herein, according to some embodiments.

Embodiments of time-based partitioning to avoid in-place updates for data set copies as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within an ETL system may present ETL services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor cause the system to:
   detect an event that triggers an update to a file structure that stores a copy of a data set, the copy being separate from a source of the data set;
   responsive to the detection of the event:
   identify one or more updated items in the data set that occurred within a time period determined based on the event; and
   store one or more respective partitions that include the one or more updated items in the data set that are determined according to a partitioning scheme into a first level folder in the file structure corresponding to the time period, wherein the one or more respective partitions are stored in one or more second level data objects of the file structure within the first level folder.

2. The system of claim 1, wherein the memory stores further program instructions that when executed by the at least one processor further cause the system to:
   identify different versions of created partitions in different storage locations of the file structure that are the same partition according to the partitioning scheme; and
   delete, from one of the different storage locations of the file structure, an earlier one of the different versions of the same partition.

3. The system of claim 1, wherein the memory stores further program instructions that when executed by the at least one processor further cause the system to:
   receiving an access request for a latest version of the copy of the data set;
   identifying a latest version for partitions used to perform the access request from two or more different locations corresponding to different time periods in the file structure; and
   performing the access request using the identified latest versions for the partitions.

4. The system of claim 1, wherein the at least one processor and the memory are implemented as part of an Extract Transform Load (ETL) service offered by a provider network, wherein the data set is stored in a first data store within the provider network and wherein the file structure for the copy of the data set is stored at a second data within the provider network.

5. One or more non-transitory, computer-readable storage media, storing program instructions that when executed on or across one or more computing devices cause the one or more computing devices to implement:
   detecting an event that triggers an update to a file structure that stores a copy of a data set, the copy being separate from a source of the data set;
   responsive to the detecting of the event:
   identifying one or more updated items in the data set that occurred within a time period determined based on the event; and
   storing one or more portions of the data set that include the one or more updated items in the data set to create respective partitions determined for the one or more portions of the data set according to a partitioning scheme into a location in the file structure corresponding to the time period.

6. The one or more non-transitory, computer-readable storage media of claim 5, wherein the one or more non-transitory, computer-readable storage media store further instructions that when executed by the one or more computing devices cause the one or more computing devices to implement updating metadata for the file structure to identify the created partitions in the location.

7. The one or more non-transitory, computer-readable storage media of claim 6, wherein the one or more non-transitory, computer-readable storage media store yet further instructions that when executed by the one or more computing devices cause the one or more computing devices to implement performing an access request to a latest version of the copy of the data set in the file structure according to an identification of latest versions of the created partitions determined from the metadata for the file structure.

8. The one or more non-transitory, computer-readable storage media of claim 5, wherein the one or more non-transitory, computer-readable storage media store further instructions that when executed by the one or more computing devices cause the one or more computing devices to implement:
   identifying different versions of created partitions in different storage locations of the file structure that are the same partition according to the partitioning scheme; and
   deleting, from one of the different storage locations of the file structure, an earlier one of the different versions of the same partition.

9. The one or more non-transitory, computer-readable storage media of claim 8, wherein the one or more non-transitory, computer-readable storage media store yet further instructions that when executed by the one or more computing devices cause the one or more computing devices to implement updating metadata for the file structure to remove an indication of the deleted partition from the one storage location.

10. The one or more non-transitory, computer-readable storage media of claim 5, wherein, in detecting the event, the program instructions cause the one or more computing devices to implement determining that an amount of time elapsed since a priori iteration of creating partitions has exceeded a threshold.

11. The one or more non-transitory, computer-readable storage media of claim 5, wherein the data set is a dimension table for a database, and wherein the partitioning scheme for the database applies a hash function to respective values of items in the portions of the data set.

12. A method, comprising:
performing by one or more computing devices:
    detecting an event that triggers an update to a file structure that stores a copy of a data set, the copy being separate from a source of the data set;
    responsive to the detecting of the event:
        identifying one or more updated items in the data set that occurred within a time period determined based on the event; and
        storing one or more portions of the data set that include the one or more updated items in the data set to create respective partitions determined for the one or more portions of the data set according to a partitioning scheme into a location in the file structure corresponding to the time period.

13. The method of claim 12, further comprising updating metadata for the file structure to identify the created partitions in the location.

14. The method of claim 13, further comprising performing an access request to a latest version of the copy of the data set in the file structure according to an identification of latest versions of the created partitions determined from the metadata for the file structure.

15. The method of claim 12, further comprising:
identifying different versions of created partitions in different storage locations of the file structure that are the same partition according to the partitioning scheme; and
deleting, from one of the different storage locations of the file structure, an earlier one of the different versions of the same partition.

16. The method of claim 15, further comprising updating metadata for the file structure to remove an indication of the deleted partition from the one storage location.

17. The method of claim 12, wherein, in detecting the event, the method further comprises determining that an amount of time elapsed since a priori iteration of creating partitions has exceeded a threshold.

18. The method of claim 12, wherein the data set is a dimension table for a database, and wherein the partitioning scheme for the database applies a hash function to respective values of items in the portions of the data set.

* * * * *